June 26, 1945.  J. A. OBERMAIER  2,379,031
CARRYING CASE
Original Filed Feb. 16, 1938   2 Sheets-Sheet 1
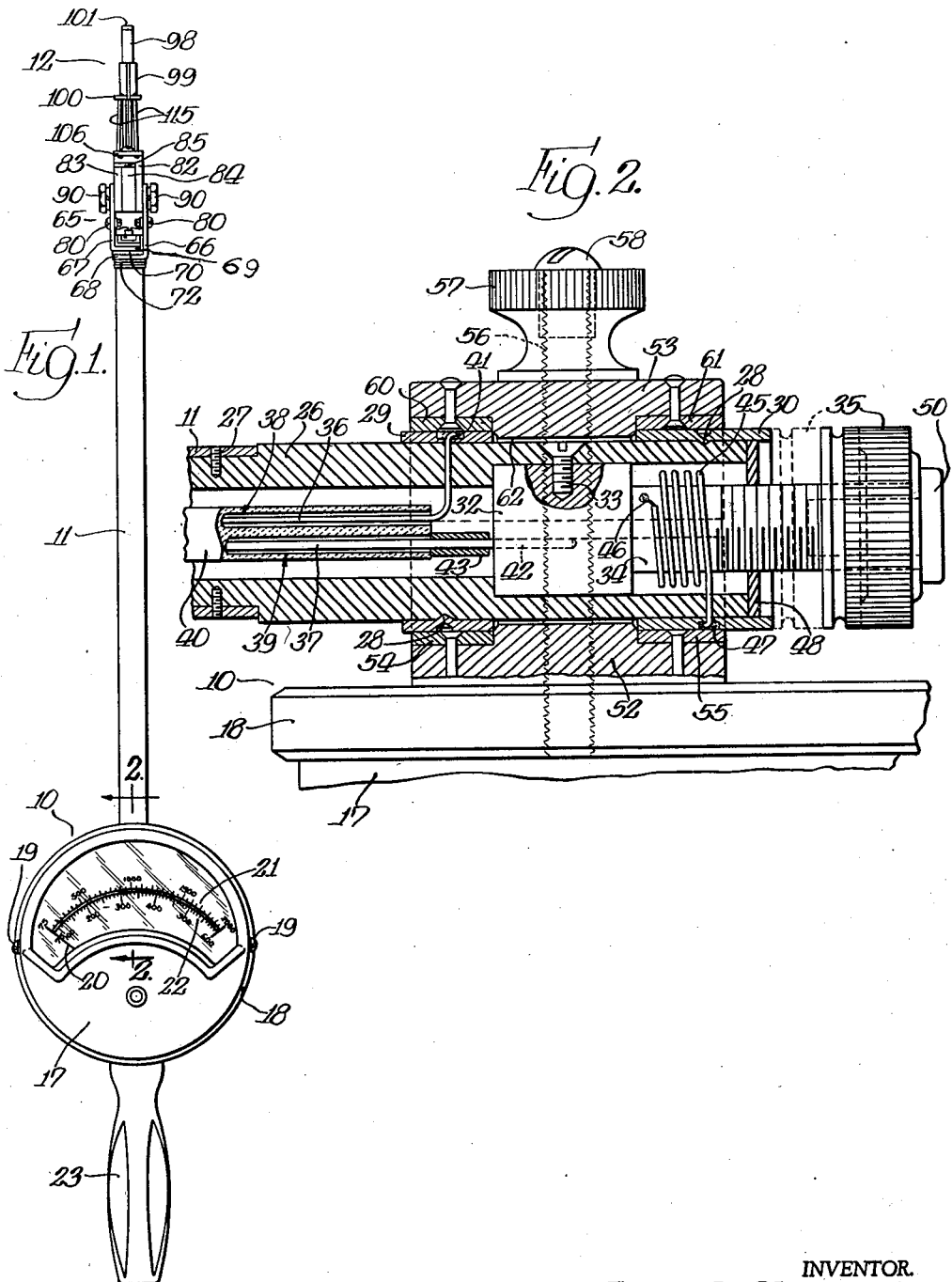
INVENTOR.
John A. Obermaier,
BY
Brown, Jackson, Boettcher & Dienner
Attys.

June 26, 1945.  J. A. OBERMAIER  2,379,031
CARRYING CASE
Original Filed Feb. 16, 1938  2 Sheets-Sheet 2
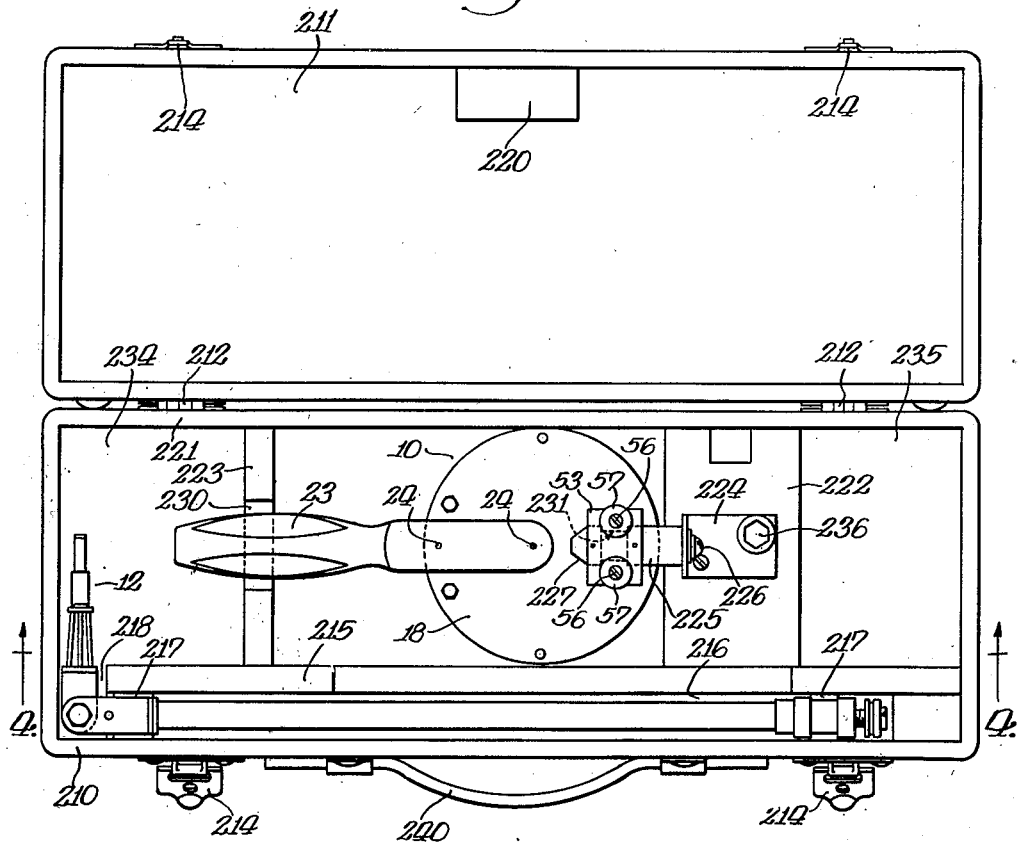
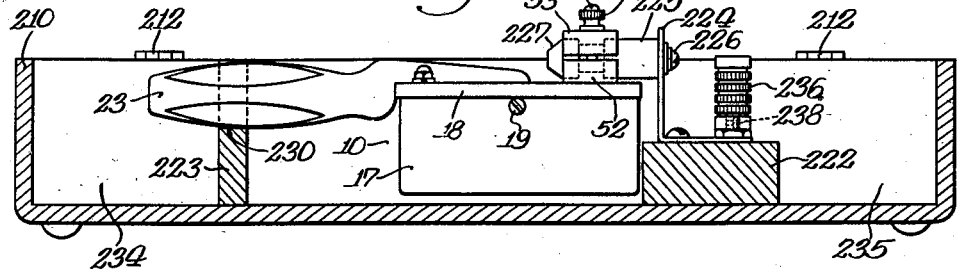
INVENTOR.
John A. Obermaier
BY
Brown, Jackson, Boettcher & Dienner
ATTYS.

Patented June 26, 1945

2,379,031

UNITED STATES PATENT OFFICE 2,379,031

CARRYING CASE

John A. Obermaier, Chicago, Ill.

Original application February 16, 1938, Serial No. 190,721. Divided and this application June 6, 1942, Serial No. 446,044

2 Claims. (Cl. 206—16)

This invention relates to new and useful improvements in carrying cases, and has particular relation to an improved carrying case for instruments of the type that have a coil, a pointer, and terminal means.

While the particular embodiment of the invention which I shall describe herein in connection with the drawings is a carrying case for pyrometers, it is to be understood that it is not limited to such use but may be employed with other instruments as suitable and desired.

The present application is a division of my copending application Serial No. 190,721, filed February 16, 1938, now Patent No. 2,285,457.

One of the main objects of the invention is to provide a case having a mounting for mechanically supporting the instrument or a portion thereof, and means for short circuiting or closing the circuit, for example, for the meter coil whereby effectively to dampen oscillation of the pointer of the instrument when the instrument is in place in the case.

It is also an object of the invention to provide a case adapted for supporting an instrument and handle part therefor, and a detachable extension arm, and further adapted to accommodate a thermocouple or other part on the extension arm while in place on said arm and angularly disposed relative thereto.

A further object of the present invention is to provide a case having the features set forth, and further provided with compartments adapted for the reception of various forms of thermocouples or other parts for employment with the instrument.

Further objects and advantages of the invention will be apparent from the following detailed description taken in connection with the accompanying drawings, in which:

Figure 1 is a front elevational view of a pyrometer with which the carrying case of the present invention is adapted for use;

Figure 2 is a fragmentary longitudinal detail section on an enlarged scale taken on the line 2—2 of Figure 1;

Figure 3 is a top plan view of a carrying case embodying the present invention, with the cover of the case in open position; and Figure 4 is a longitudinal section through the carrying case taken on the line 4—4 of Figure 3.

Referring now to the drawings, the illustrated form of instrument with which the illustrated form of carrying case is adapted for use is shown as comprising an indicator 10 having an extension arm 11 upon the end of which a plurality of different types of thermocouples are adapted for interchangeable mounting.

The indicator 10 comprises a metallic casing 17 secured to an insulating base 18 by screws 19. The casing 17 serves as a housing for a meter which may be of any conventional galvanometer or milli-voltmeter construction, such, for example, as the general type of construction shown and described in my Patent No. 1,597,327, issued August 24, 1926. The meter includes a pointer 20 and a pair of scales 21 and 22. The scale 21 is calibrated for high temperature indications, and the scale 22 is calibrated for low temperature indications as will hereinafter appear. Each scale 21 and 22 is graduated in terms of temperature, preferably in degrees of Fahrenheit. The casing 17 is provided with a handle 23 secured to the base 18.

The extension arm 11 comprises a tubular metallic member having an insulating sleeve 26 secured at 27 in the end of the same which is mounted on the housing 17. Encircling the sleeve 26 at spaced locations longitudinally thereof and secured rigidly on the sleeve by prick punches 28, or in any other suitable or preferred manner, are a pair of metallic collector rings 29 and 30. These collector rings 29 and 30 are insulated from one another and from the tubular arm 11 by the sleeve 26. A metallic terminal member 32 (Figure 2) is fitted in the sleeve 26 and secured therein by a screw 33. This terminal member 32 has an integral reduced and externally threaded stud 34 which extends out axially from the adjacent end of the extension arm and has a thumb nut 35 threaded thereon.

The lead wires 36 and 37, which electrically connect the particular thermocouple mounted on the outer end of the extension arm 11 to the indicator 10, extend through the tubular arm 11 and are insulated from this arm and from each other in any suitable or preferred manner. In the illustrated embodiment of the invention, these wires 36 and 37 extend through openings 38 and 39 in a small diameter insulator 40 which may be formed of porcelain or other suitable insulating material. This insulator 40 is shown of circular section, and extends substantially throughout the length of the tubular arm 11. At one end, the wire 36 passes out from the adjacent end of the insulator 40, transversely through the wall of the insulating sleeve 26, and is connected at 41 to the collector ring 29. The adjacent end of the other wire 37 passes out lengthwise from the insulator 40, and is connected at 42 to the terminal member 32. A short tubular insulator 43, of the usual fabric insulation or other suitable insulating material, surrounds the wire 37 between the terminal member 32 and the adjacent end of the insulator 40.

Disposed within the outer end of the insulating sleeve 26 and coiled about the terminal stud 34, or otherwise suitably disposed, is a resistance element 45. One end of this resistance element 45 is connected at 46 to the terminal stud 34, and the other end extends out transversely through a suitable opening in the wall of the sleeve 26 and is connected at 47 to the collector ring 30. An insulating washer may be provided at 48. The thumb nut 35 is operable to short circuit the resistance element 45, thereby connecting the lead wire 37 directly to the collector ring 30 through the terminal member 32 for low temperature readings on the scale 22, or to connect the wire 37 to the collector ring 30 through the resistance element 45 for high temperature readings on the scale 21.

When the nut 35 is out of contact with the adjacent end of the collector ring 30, for example, in the position shown in Figure 2, the circuit from the wire 37 is through the terminal member 32 and resistance element 45 to the collector ring 30, but when the nut 35 is threaded up into contact with the ring 30, as shown in dotted lines in Figure 2, the circuit is from the wire 37 and through the terminal member 32 and nut 35, directly to the collector ring 30, short circuiting the resistance element 45. The outer end of the terminal stud 34 has an axial threaded opening into which a headed screw 50 is threaded, the head of the screw 50 constituting a stop for limiting the outward threading movement of the nut 35 on the stud 34 to prevent unintentional displacement of the nut 35 from the stud 34.

For the purpose of mounting the extension arm 11 on the indicator housing, complementary insulating mounting blocks 52 and 53 are provided. The block 52 is rigidly secured to the under side of the insulating base 18, and has a pair of semi-circular grooved portions. A pair of semi-circular metallic collector ring parts 54 and 55 are positioned in spaced relation in these grooved portions and insulated, one from the other, by the block 52. These collector ring parts 54 and 55 are connected to the respective terminals of the meter coil (not shown) and are rigidly secured in place in the block 52. A pair of threaded posts 56, extending from the block 52, pass loosely through openings in the other block 53, and thumb nuts 57 are threaded upon the outer ends of these posts 56. As shown in Figure 2, screws 58 are threaded into the outer ends of the posts 56 and constitute stops for limiting the outward threading movement of the nuts 57.

The block 53 has a pair of semi-circular grooved portions which are complementary to the grooved portions in the block 52, and a pair of semi-circular collector ring parts 60 and 61 are positioned in spaced relation in these grooved portions in the block 53. These collector ring parts 60 and 61 are insulated from each other by the block 53 and are complementary to and in registration with the collector ring parts 54 and 55. The internal diameters of the depressions in the blocks 52 and 53 between the collector ring parts 54 and 55 and 60 and 61, respectively, are preferably less than the internal diameters of the collector ring parts to present raised intermediate insulating portions 62 which fit between the collector rings 29 and 30 on the extension arm 11 when the end of this arm with these rings is inserted between the blocks 52 and 53. This facilitates positioning the inserted end of the extension arm so that the collector rings on the extension arm meet and properly contact the collector rings in the blocks 52 and 53.

The extension arm 11 is attached or mounted on the indicator 10 by loosening the thumb nuts 57 and separating the block 53 from the block 52 sufficiently to permit the adjacent end of the arm 11 to be readily placed between the blocks 52 and 53. The end of the arm 11, equipped with the collector rings 29 and 30, is then inserted between the blocks 52 and 53 so that the collector rings 29 and 30 are in position to meet and contact with the collector ring parts 54, 60, and 55, 61, respectively. The block 53 is then pushed down, and the arm 11 may be turned about its axis to the position desired, whereupon the thumb nuts 57 are tightened to clamp the arm 11 rigidly in place to the instrument with the circuit completed between the collector rings 29 and 30 and the coil of the meter mechanism within the housing 17. By loosening the thumb nuts 57, the extension arm may be turned about its axis to different angular positions or readily removed from the indicating instrument and handle unit of the device for insertion in a carrying case.

The outer end of the arm 11 is provided with a yoke or fork 65 for receiving any of the various types of thermocouples. This yoke 65 comprises, as shown in Figure 1, a pair of L-shaped metallic members 66 and 67 having apertured bases 68 and 69, respectively. These members 66 and 67 are assembled and insulated from each other by insulation 70 which may be mica or other suitable insulation. Mica, "Bakelite," or other suitable insulation at 72 insulates the base 68 of the L-shaped fork member 66 from the adjacent end of the arm 11, and the fork members are secured rigidly in place on the outer end of the arm 11.

The lead wires 36 and 37 extend from the outer end of the insulator 40 and are connected by screws 80 and cooperating nut members, one to each of the fork members 66 and 67. The fork 65 thus constitutes not only a mechanical fork for supporting the various thermocouples but also an electrical fork through which the various thermocouples applied thereto are connected electrically to the lead wires 36 and 37. This eliminates the necessity for pigtail connections and the like, and is a distinct advantage.

The particular thermocouple 12 shown applied to the fork 65 is for temperatures of either metallic or non-metallic surfaces, whether the surface is soft or hard, clean or coated. It is especially suitable for plastic or rubber molds, platens, plates, glassware, walls or other relatively flat surfaces. The unique construction reduces conduction loss to a minimum and gives maximum accuracy.

The thermocouple 12 comprises a mounting base consisting of an L-shaped metallic member 82 and a flat metallic member 83 insulated from each other by a fiber, "Bakelite," or other suitable insulating block 84 disposed therebetween. Mica or other suitable insulation at 85 insulates the apertured base of the member 82 from the adjacent end of the member 83. The member 82 is secured to the block 84 by screws (not shown). The member 83 is similarly secured to the block 84 from the opposite side by screws (not shown).

The thermocouple mounting base is pivotally secured between the projecting legs of the fork 65 by coaxial screws 90. These screws 90 have heads at their outer ends, and, adjacent said heads, have cylindrical portions which fit in openings in the projecting legs of the fork 65. The reduced diameter inner ends of these screws 90 are threaded and have threaded engagement with correspondingly threaded openings in the metallic members 82 and 83 of the thermocouple mounting base. Phosphor bronze or other suitable washers, between the heads of the screws 90 and the legs of the fork 65, provide friction tight joints which permit turning movement of the thermocouple base about the cylindrical portions of the screws 90 and frictionally hold the base of the thermocouple in the different angular positions to which it is turned.

The angular fork member 66 of the yoke 65 is preferably provided with a plus (+) marking, and the angular member 82 of the thermocouple base is likewise preferably provided with a plus (+) marking, or the parts are otherwise suitably marked to make sure that the thermocouple is properly applied to the yoke 65. If the thermocouple were applied with its plus (+) side in contact with the minus (—) side of the yoke 65, the instrument would read backwards.

The tip of the thermocouple 12 comprises a small diameter insulating tip 98 formed of porcelain or other insulating material which will withstand the high temperatures to which the device is subjected. The insulating tip 98, shown of circular section, is cemented or otherwise suitably secured in a metallic tip holder 99 of tubular form and provided with an annular base flange 100 at its inner end. A disc 101 of platinum, gold, or other suitable material, secured in place at the outer end of the tip 98 constitutes the hot junction of the thermocouple.

The lead wires for the thermocouple extend through openings in the insulating tip 98 and are insulated from one another by this tip. The outer ends of these wires are welded or otherwise suitably joined to the disc 101. These wires pass through openings in a clamping plate 106 and in the base of the angular member 82 and extend through suitable openings in the insulating block 84 and are turned out and welded or otherwise connected at their opposite ends, one to the metallic base member 82 and the other to the metallic base member 83. Thus, when the base member of the thermocouple is applied to the yoke 65, the contact between the yoke members 66 and 67 and the base members 82 and 83 completes the circuit between the last mentioned lead wires and the lead wires 36 and 37.

The tip of the thermocouple is supported an appropriate distance from the base of the thermocouple by two hairpin or U-shaped wires 115 preferably formed of steel wire, piano wire, or the like, so that they will be of great strength, and at the same time may be of small dimension. These wires 115 conduct very little heat, and at the same time they are yieldable to an extent so that the thermocouple will adapt itself to the surface to which it is applied.

The device of the present invention is provided with a carrying case designated in its entirety at 210 in Figures 3 and 4. This case 210 has a cover 211 hinged thereto at 212 and provided with suitable latch devices 214 for latching the cover closed.

The interior of the case 210 is provided with a longitudinally extending partition 215 forming a narrow longitudinally extending compartment 216 within which the extension arm 11 is supported on supports 217. The partition 215 terminates short of one end of the case to provide a space at 218 to receive the thermocouple 12 by disposing the same at right angles to the arm 11. In this way, the thermocouple need not be disconnected from the arm 11, but may be carried in the case pivotally connected to the end of the arm 11. It is to be understood, however, that the thermocouple may be disconnected from the arm and carried in one of the compartments of the case separately from the arm 11. The cover 211 has a block 220 which engages the extension arm 11 intermediate its ends when the cover is closed, and holds the extension arm firmly in place.

Extending transversely between the partition 215 and the opposite wall 221 of the case is a transverse block 222 and a transverse partition 223. The block 222 has an angular bracket 224 secured thereto, and the upstanding leg of this bracket has a metallic post 225 secured to the bracket by a screw 226. The post 225 is pointed at 227 and is formed to fit between the blocks 52 and 53 of the instrument 10 in contact with the collector ring parts 60, 54 and 61, 55, thereby connecting these collector ring parts and short circuiting or closing the circuit of the meter coil when the instrument 10 is placed in the case on the post 225 as shown. This short circuiting or closing of the circuit of the meter coil dampens oscillation of the pointer 20. The partition 223 has a notched opening 230 for receiving the handle 23.

The post 225 is grooved at 231 to receive the reduced diameter intermediate portions 62 of the blocks 52 and 53, so that these reduced intermediate portions will not prevent the collector ring parts 60, 54 and 61, 55 from properly contacting the post 225 when the instrument is applied thereto. To mount the instrument on the post 225 as shown, the thumb nuts 57 are loosened sufficiently to permit application of the blocks 52 and 53 over the post, and then when the reduced diameter intermediate portions are disposed to fit in the groove 231, the thumb nuts 57 are tightened to clamp the instrument and handle unit firmly in place mechanically on the post 225 with the collector ring parts 60, 54 and 61, 55 in contact with the post for the purpose above described.

The interior of the case, together with the partitions 215 and 223, the blocks 220 and 222, and the supports 217, is preferably felt covered or otherwise suitably finished, and the outside of the case may be finished as desired. A carrying handle is provided at 240. The compartments 234 and 235 are adapted for the reception of the various forms of thermocouples for employment with the arm 11. A socket tool 236 is provided for application to the heads of the screws 90 for removing and applying these screws in applying the different thermocouples. At the end opposite the end provided with the socket for application to the heads of the screws 90, this tool 236 has a threaded opening for threaded engagement with an upright threaded post 238 on the block 222, the tool 236 being adapted to be mounted on this post, as shown, when not in use.

I do not intend to be limited to the precise details shown or described.

I claim:

1. A carrying case for an instrument having a coil, a pointer, and an indicator provided with a coil, a pointer, and a terminal connector comprising insulating blocks and terminals connected to the coil of the indicator, said carrying case having a bracket secured therein, and a metallic post secured to said bracket and engageable between the insulating blocks of the terminal connector of the indicator and adapted to be clamped therebetween and in contact with the terminals on said blocks whereby mechanically to support the indicator and to short circuit the coil of the indicator for the purpose of dampening vibration of the pointer.

2. A carrying case for use with a pyrometer having an indicator provided with a coil, a pointer, and a terminal connector having terminals connected to the coil of the indicator, said carrying case having an indicator supporting member engageable with said terminal connector for mechanically supporting the indicator in the case, said indicator supporting member including conducting means adapted when engaged with the terminal connector of the indicator to interconnect the terminals thereof, thereby short circuiting the coil of the indicator for the purpose of dampening vibration of the pointer of the indicator.

JOHN A. OBERMAIER.